US005678664A

United States Patent [19]
Marasco

[11] Patent Number: 5,678,664
[45] Date of Patent: Oct. 21, 1997

[54] TRAILER BREAK-AWAY DEVICE

[75] Inventor: Albert P. Marasco, Des Moines, Iowa

[73] Assignee: Dico, Inc., Des Moines, Iowa

[21] Appl. No.: 535,720

[22] Filed: Sep. 28, 1995

[51] Int. Cl.$^6$ ................................................. B60T 13/08
[52] U.S. Cl. ........................ 188/112 R; 280/446.1
[58] Field of Search ..................... 188/112 R, 1.11 R, 188/20, 345; 280/446.1

[56] References Cited

U.S. PATENT DOCUMENTS

| | | | |
|---|---|---|---|
| 3,180,454 | 4/1965 | De Angelis et al. | 188/112 R |
| 3,215,230 | 11/1965 | Wherry | 188/112 R |
| 3,682,278 | 8/1972 | Wherry et al. | 188/112 R |
| 4,239,252 | 12/1980 | Huetsch | 188/112 R |
| 5,485,900 | 1/1996 | Denny | 188/112 R |
| 5,492,204 | 2/1996 | Wallace | 188/112 R |

Primary Examiner—Matthew C. Graham
Attorney, Agent, or Firm—Brian J. Laurenzo; Kent A. Herink; Michael C. Gilchrist

[57] ABSTRACT

A trailer break away safety mechanism which brings a trailer to a controlled stop after disengagement with a pulling vehicle. The mechanism consists of a cable which remains attached to the trailer after the trailer has disengaged from the pulling vehicle. As the trailer slows in relationship to the pulling vehicle, the cable actuates a braking mechanism on the trailer. Once the breaking mechanism has been fully actuated, the S-hook which attaches the cable to the pulling vehicle straightens, thereby completely releasing the trailer from the pulling vehicle. The cable is connected to a lever which pivots to actuate the braking system on the trailer. A catch spring and catch pin are provided to prevent the lever from inadvertently moving to its nonactuation position after the trailer has separated from the pulling vehicle. The use of the lever allows accurate and positive engagement of the trailer braking system which may be easily released by simply lifting a catch pin up and away from the actuated lever.

19 Claims, 9 Drawing Sheets section A-A

TRAILER BREAK-AWAY DEVICE

BACKGROUND OF THE INVENTION

The present invention relates generally to trailer braking systems and, more particularly, to an apparatus for actuating a trailer brake when a trailer, mounted to a pulling vehicle, becomes detached from the pulling vehicle as the trailer is being pulled.

Trailer break-away brake actuating mechanisms are known in the art. These mechanisms generally operate through a cable or chain, which is attached to a pulling vehicle by means of an S-hook or similar attachment device. The opposite end of the cable is operably connected to the trailer's braking system so that the trailer brake is actuated when the cable is pulled. When the trailer becomes detached from the pulling vehicle during operation, the trailer, no longer being pulled, tends to separate from the pulling vehicle if the safety chains fail. The S-hook, however, remains attached to the pulling vehicle. As the pulling vehicle pulls the cable, the cable actuates the trailer brake mechanism thereby stopping the trailer. The force on the cable increases until the S-hook straightens and releases the cable from the pulling vehicle. To maintain pressure on the cable and to prevent the cable from releasing the trailer braking mechanism, a friction lock is generally used to prevent the cable from retracting and prematurely releasing the trailer brake. Although such mechanisms are generally adequate to stop a break-away trailer, they do possess several inherent drawbacks.

Most prior art systems operate by means of such a friction lock to prevent the extended cable from retracting after the cable releases from the pulling vehicle. During connection and deconnection of the trailer to the pulling vehicle, the cable is often inadvertently pulled toward the pulling vehicle. Even a slight tug is often enough to actuate the break-away mechanism slightly, or to cause dangerous slack in the cable when the friction lock prevents the cable from returning taut after connection to the pulling vehicle. Even though the brake mechanism may be actuated only somewhat, this slight actuation can cause excessive wear on the trailer brake, an excessive burden on the pulling vehicle, a decrease in fuel economy, and an increase in maintenance costs. Over time, this excessive burden could even cause the trailer brakes to raft in an emergency situation. If the brake was applied over a length of time, premature lining wear or overheating could decrease the effectiveness of the trailer brakes to the point where they would no longer be able to stop the trailer.

Another problem with existing trailer break-away brake actuators is that the friction locks used to trap the cable after actuation of the trailer brakes are subject to slippage and inconsistent actuation, especially under inclement conditions. Although friction locks are simple in that they require no more than a piece of spring metal and a cable, if the friction lock becomes worn or if the cable becomes wet, it is possible that the friction lock would either not retain the cable at the proper orientation to adequately apply the trailer brakes, or that the position at which the cable was retained would be sufficient only to partially actuate the brakes, thereby causing the brakes to operate at less than their full effectiveness.

Still another drawback of prior art break-away systems is the inability of an operator to readily discern whether the system is in an actuated or nonactuated state. If an operator views a prior art device and assumes that the device is in the nonactuation state, both the pulling vehicle and the trailer could be damaged if the operator begins to move the pulling vehicle before releasing the braking system.

In a pending application, U.S. patent application Ser. No. 08/215,724, filed Mar. 22, 1994, entitled Trailer Break-away Device, many of the difficulties of the prior art have been overcome. That application discloses flanges connected to a releasable connection between a towing vehicle and a trailer brake system. The flanges are allowed to pass by a flange arrestment means in only a single direction, thereby locking the brake system in an actuation position when the towing vehicle separates from the trailer. The present invention utilizes a lever, which pivots relative to the break-away mechanism during actuation. The lever is more durable and simpler to use than the flange and flange arrestment means.

The difficulties encountered in the prior art discussed hereinabove are substantially eliminated by the present invention.

SUMMARY OF THE INVENTION

Accordingly, it is an object of the present invention to provide a brake locking device with an indicator mechanism outside of the housing to show at what stage of locking the brake locking device is.

It is another object of the present invention to provide a brake locking device which can be actuated from a plurality of angles relative to the device housing.

Yet another object of the present invention is to provide a brake locking device which prevents partial actuation of the brake.

Still another object of the present invention is to provide a brake locking device which can be easily released after actuation.

Another object of the present invention is to provide an enclosed brake locking device which prevents deactuation of the device once the device has been actuated.

Another object of the present invention is to provide a break-away brake locking device that is durable and simple to use.

By the present invention, it is proposed to overcome the difficulties encountered heretofore. To this end, a braking mechanism is provided which actuates a trailer brake when the trailer becomes detached from a pulling vehicle. The braking mechanism is provided with means, such as a cable, for releasably connecting the pulling vehicle to a trailer brake. The braking mechanism is also provided with a lever which is pivotally connected to a housing. The braking mechanism is provided with means connecting the pulling vehicle to the lever such as a cable. The braking mechanism is also provided with means connecting the lever to the trailer brake. Means are provided for allowing the lever to pivot in a first direction relative to the housing and for preventing the lever from pivoting in a second direction relative to the housing.

Preferably, the means connecting the pulling vehicle to the lever and the means connecting the lever to the trailer brake are two ends of a cable which fit within a channel provided in the lever to pivot the lever as the cable is pulled to actuate the trailer brake. The lever is toothed on either side of the channel to allow the lever to be engaged by a catch spring secured on one end to the trailer housing and on the other end to a catch pin which fits between the teeth of the lever. As the pulling vehicle moves away from the trailer, the cable is pulled, thereby pivoting the lever and actuating the trailer brake. As the lever is pulled, the teeth pass by the catch pin and catch spring, but are prevented from returning past the catch pin and catch spring, thereby locking the brakes in the actuated position.

DETAILED DESCRIPTION OF THE INVENTION

Figure 1:
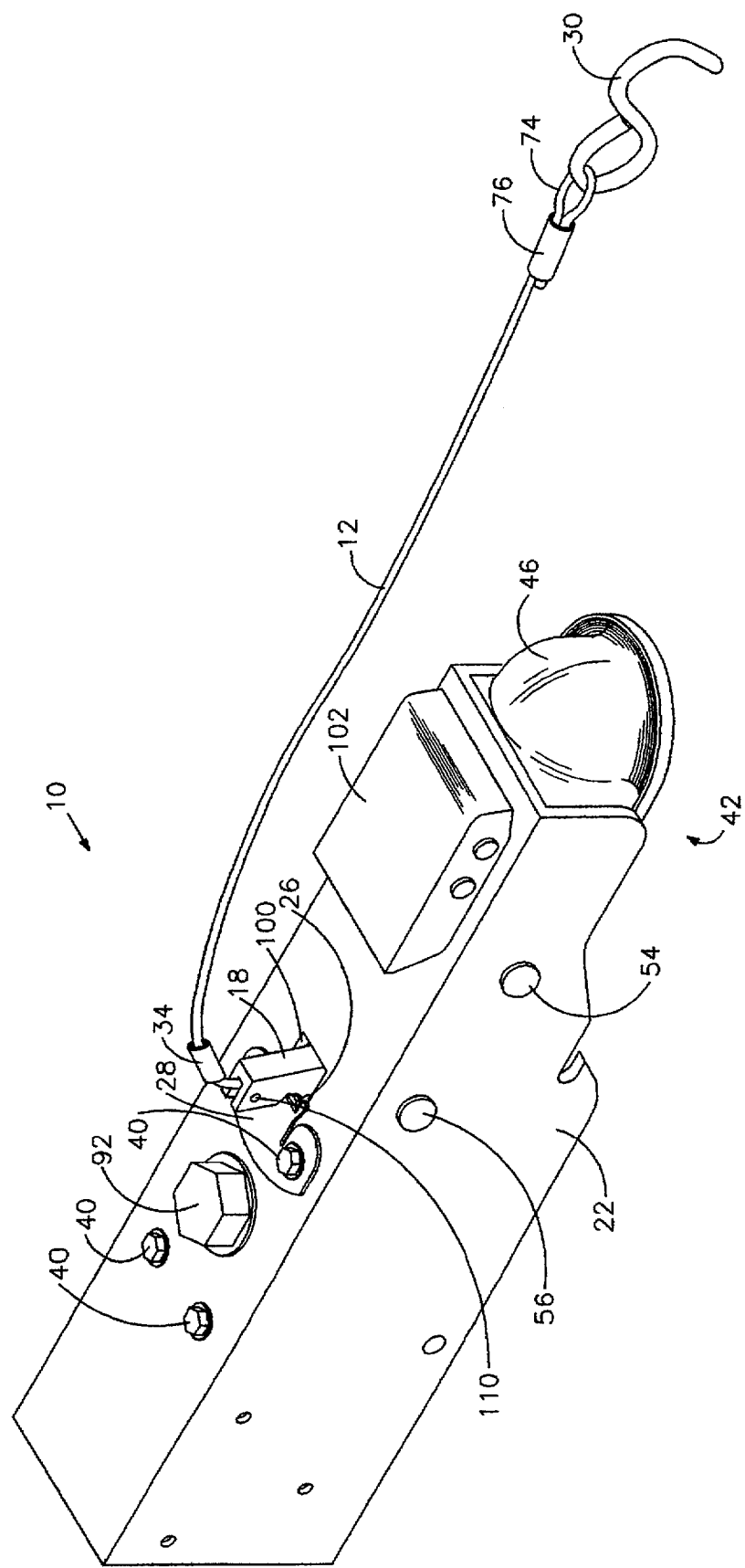
FIG. 1 is a perspective view of the braking mechanism showing the lever in the nonactuation position.

The invention relates to a trailer break-away mechanism 10 designed to apply a trailer's brakes when the trailer 84 becomes detached from a trailer towing vehicle 86. The break-away mechanism 10 consists of a cable 12 which is attached at one end to a trailer braking system 14 and at the other end to the trailer towing vehicle 86. The cable 12 is set into a channel 16 provided in a lever 18. The lever 18 is pivotally received by a trailer housing 22, which encloses the trailer braking system 14, through an aperture 100 in the housing 22. The lever 18 is provided with teeth 24 which are engaged by a catch pin 26. The catch pin 26 is retained by one end of a catch spring 28. The opposite end of the catch spring 28 is secured to the trailer housing 22 which allows the catch pin end of the catch spring 28 to raise in relationship to the trailer housing 22. The design of the break-away mechanism 10 is such that as the cable 12 is pulled upon disengagement of the trailer 84 from the trailer towing vehicle 86, the lever 18 is pivoted relative to the trailer housing 22. As the lever 18 pivots, the cable 12 is pulled, thereby engaging the trailer braking system 14 and slowing the trailer 84. As the lever 18 pivots, the catch spring 28 bends and allows the catch pin 26 to pass by the teeth 24 of the lever 18. When the cable 12 releases from the towing vehicle 86, however, the catch spring 28 returns to its original orientation, positioning the catch pin 26 against the teeth 24 which locks the lever 18 into the actuation position. To release the trailer break-away mechanism 10, the catch pin 26 is simply raised to allow the lever 18 to pivot back into its nonactuation orientation.

Figure 7:
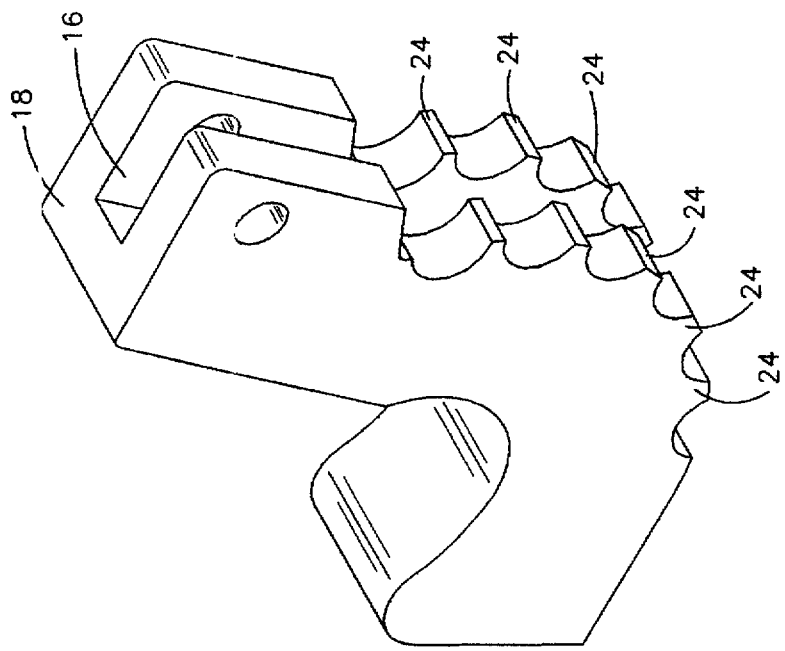
FIG. 7 is a rear perspective view of the lever of FIG. 1.
Figure 6:
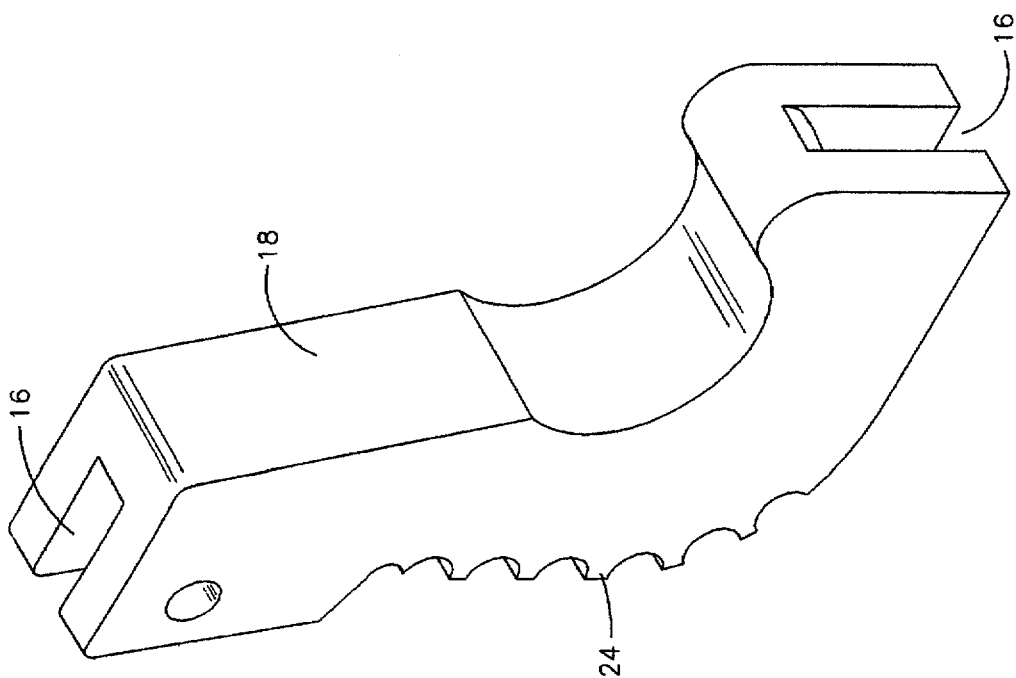
FIG. 6 is a front perspective view of the lever of FIG. 1.

In the preferred embodiment, the lever 18 is an arcuate ratchet (FIGS. 6 & 7). The lever has a smooth concave surface about which the lever 18 pivots. The lever has a substantially convex surface from which the teeth 24 extend. The lever may be made of any suitably strong material, and may be formed of a single piece or as three pieces, with the channel 16 being formed by the space between the two outside pieces.

Figure 2:
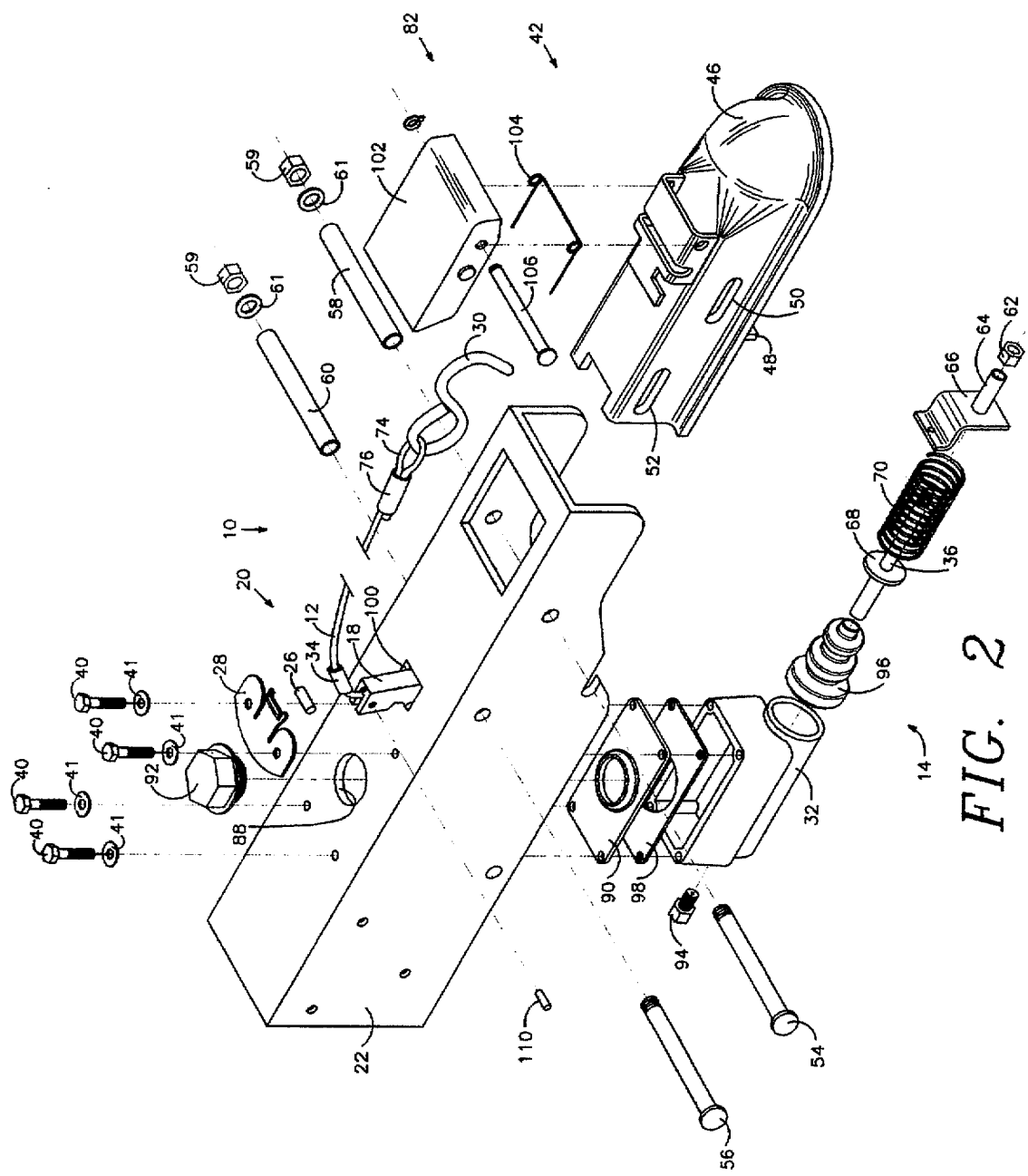
FIG. 2 is an exploded view of the braking mechanism of FIG. 1.
Figure 4:
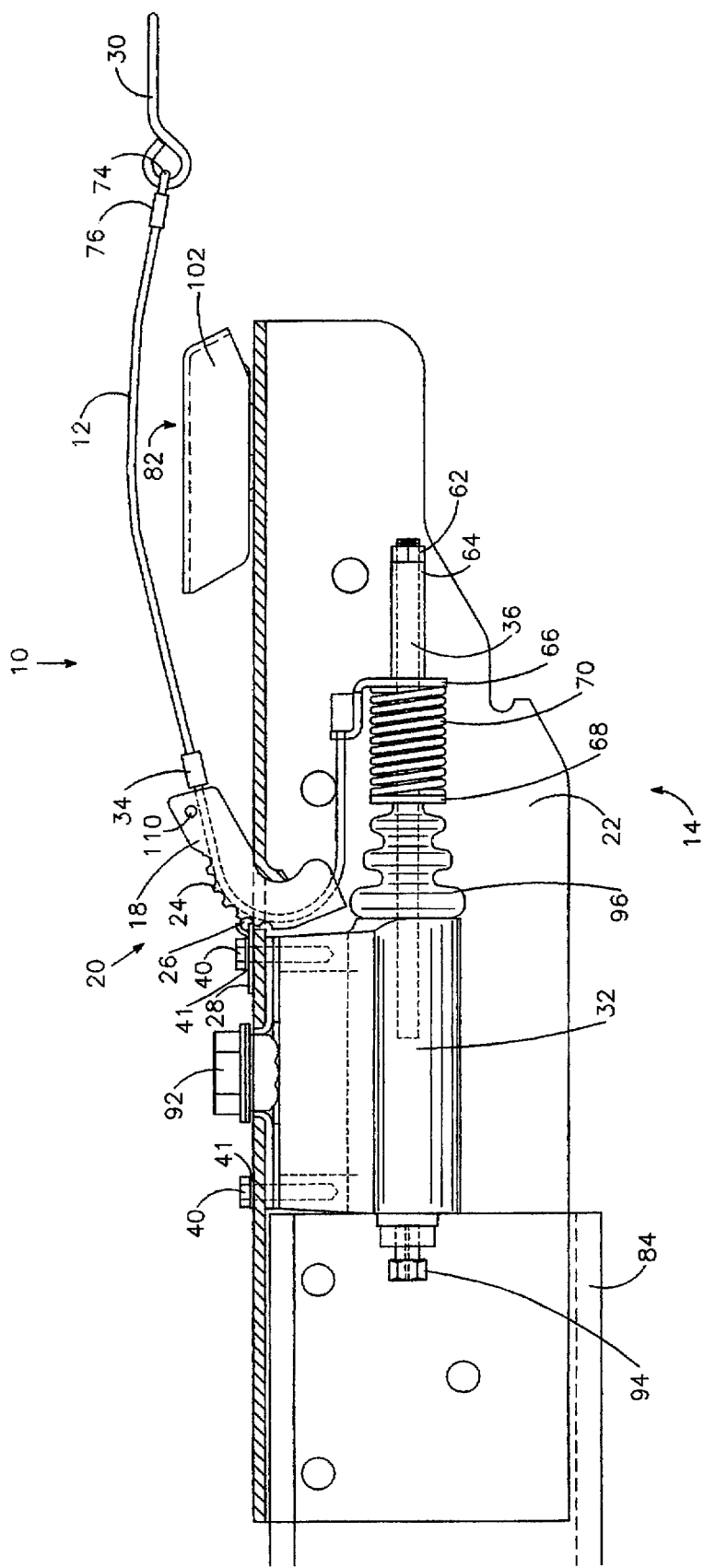
FIG. 4 is a cross-sectional side elevation of the braking mechanism of FIG. 1 showing the mechanism in a break-away actuation position.

The cable 12 is connected to the towing vehicle 86 by means of an S-hook 30. When the trailer 84 becomes detached from the towing vehicle 86, the trailer 84 moves away from the towing vehicle 86, and the safety chains 112 become taut between the trailer 84 and the towing vehicle 86. If the safety chains 112 fail, then the break-away mechanism 10 is activated. As the trailer 84 moves away from the towing vehicle 86, the towing vehicle 86 pulls the cable which pivots the lever 18, thereby actuating the trailer braking system. The trailer 84 then begins to decelerate which increases the load on the cable 12. This increased load on the cable causes the trailer braking mechanism 14 to become fully actuated rotating the lever 18 to its full actuation position (FIG. 4). As the cable load increases, the S-hook 30 bends and straightens, releasing from the towing vehicle 86. When the braking mechanism 14 is actuated, it exerts a force against the cable 12. This force pulls the end of the cable 12, which is attached to the S-hook 30, back toward the trailer housing 22 as soon as the S-hook 30 straightens and the cable 12 becomes detached from the towing vehicle 86. A stop 34 swaged to the cable 12 and a roll pin 110 received through the lever 18 prevent the cable 12 from moving past the lever 18. Similarly, the lever 18 is prevented from pivoting back into a nonactuated position by the catch pin 26 attached to the catch spring 28. As the catch pin 26 engages the teeth 24 of the lever 18, the lever 18 becomes trapped and the trailer braking system 14 is thereby prevented from becoming deactuated. The trailer 84, therefore, comes to a safe stop until the towing vehicle 86 can return to pick up the disengaged trailer. In the figures, a break-away mechanism 10 is shown including a trailer housing 22, a trailer braking system 14, and a break-away lock lever assembly 20 (FIG. 2). In the preferred embodiment of the present invention, the trailer housing 22 is constructed of steel and contains the trailer braking system 14. The trailer housing 22 not only affords the break-away mechanism 10 an aesthetically pleasing appearance, but also protects the braking system 14 from exposure to the elements. In the preferred embodiment, the braking mechanism 14 is a hydraulic master cylinder 32 which is operably connected via brake lines to the brake clusters mounted on the trailer's axles (not shown). As a piston push rod 36 is moved into a master cylinder 32, hydraulic fluid is displaced to apply the brakes and slow the trailer 84. In the preferred embodiment, the trailer housing 22 has an aperture 88 through which hydraulic fluid can be added to the master cylinder 32. Also included in the trailer braking mechanism of the preferred embodiment is: a top cover 90 of the master cylinder, a master cylinder cap 92, a connector with orifice 94, a flexible cylinder boot 96, and a gasket 98 to seal the master cylinder.

Figure 5:
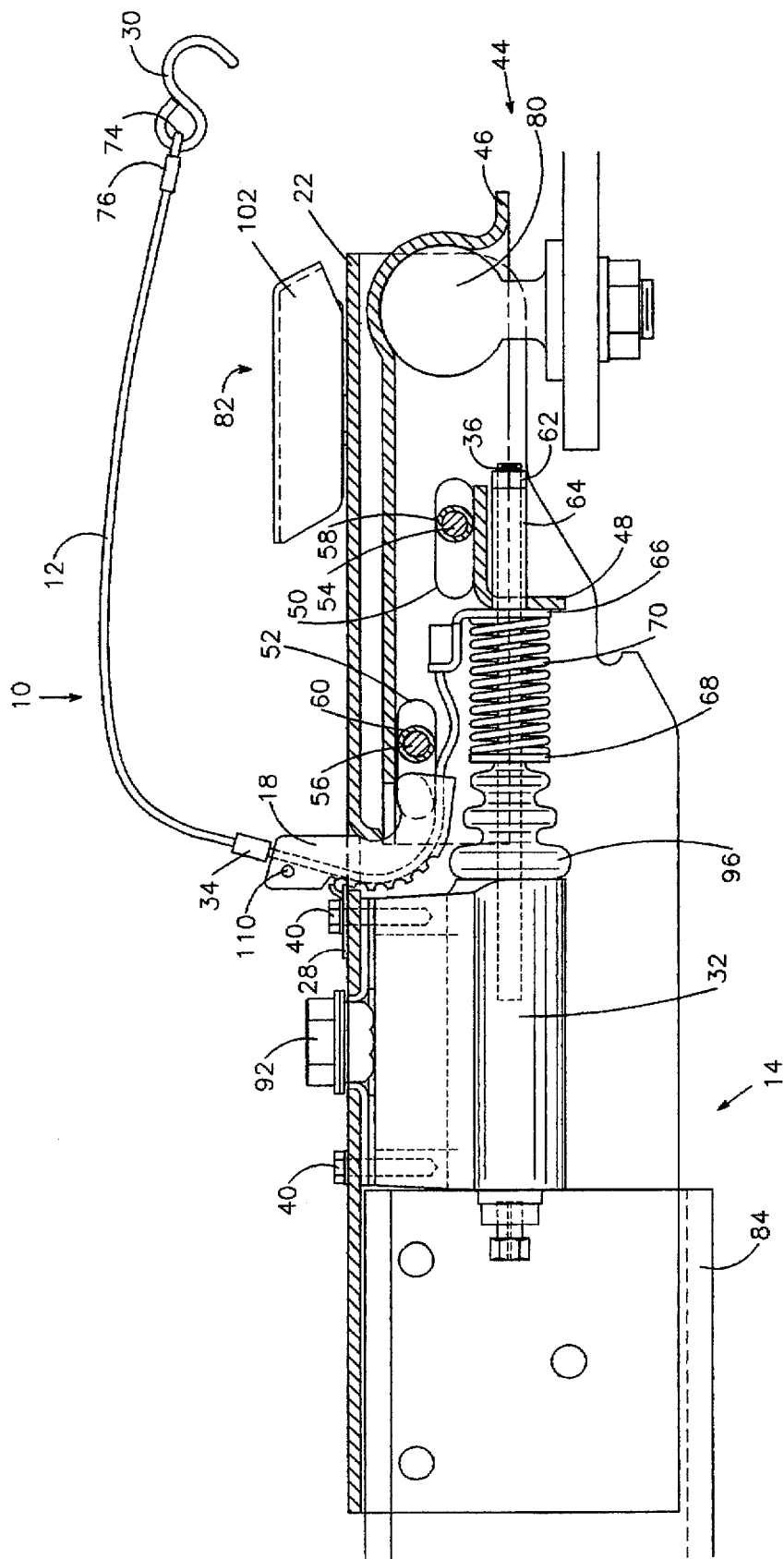
FIG. 5 is a cross-sectional side elevation of the braking mechanism of FIG. 1 showing the mechanism in a surging actuation position.

Control of surging of the trailer 84 relative to the towing vehicle 86 is accomplished through the use of the master cylinder 32 and the piston push rod 36 (FIG. 5). The master cylinder 32 is secured to the trailer housing 22 with bolts 40 and included washers 41. A hitch 42 is slidably coupled to the trailer housing 22. An L-shaped push plate 48 is secured within the body 46 of the hitch 42. A front slot 50 and a rear slot 52 are provided on the body 46. The trailer housing 22 is connected to the trailer hitch 42 by a front bolt 54 and a rear bolt 56. The front bolt 54 passes through the front slot 50 on the body 46 and is secured on either side to the trailer housing 22. The rear bolt 56 passes through the rear slot 52 and is also secured on either side to the trailer housing 22.

Figure 3:
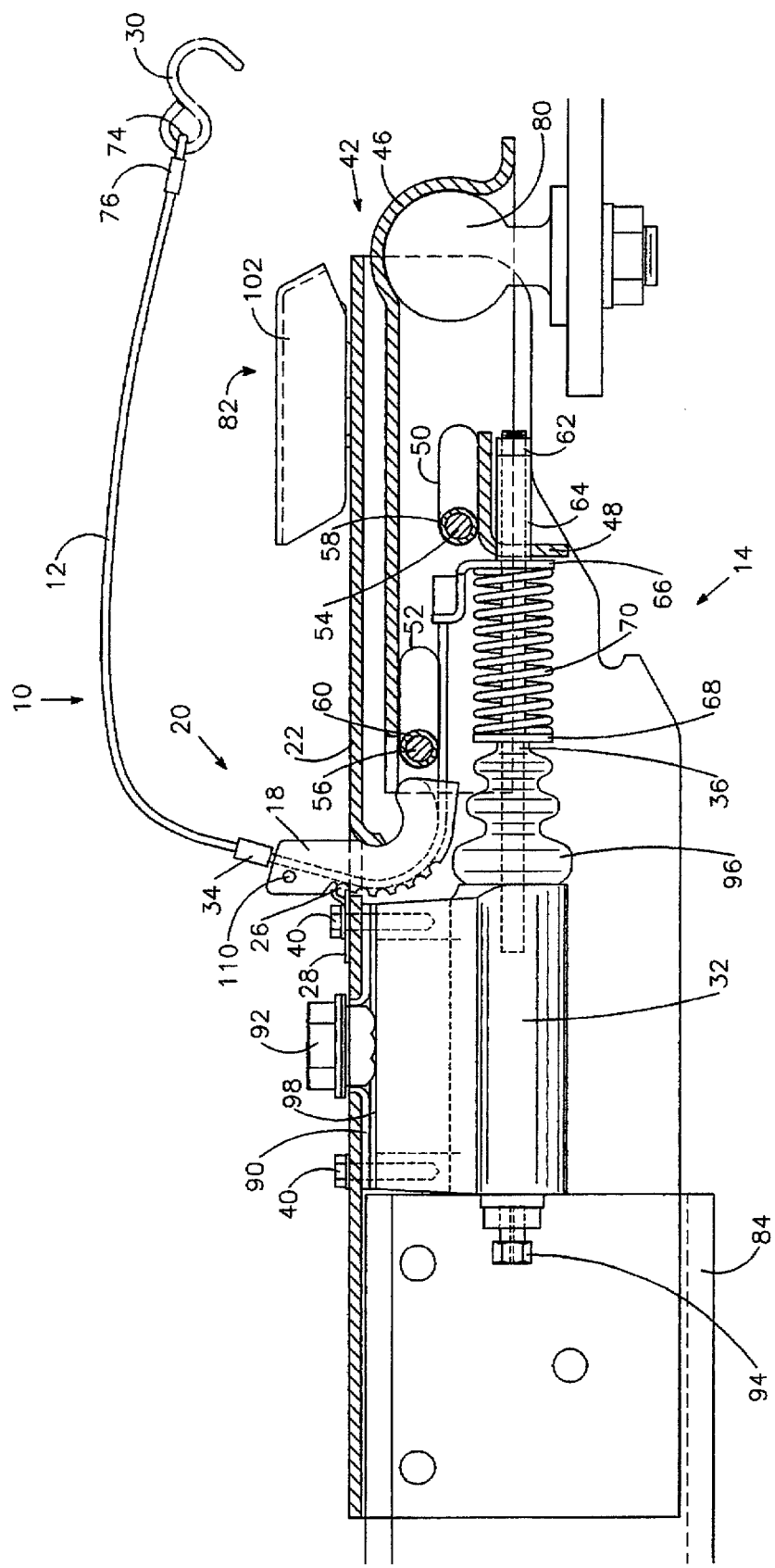
FIG. 3 is a cross-sectional side elevation of the braking mechanism of FIG. 1 showing the lever in the brake nonactuation position.

The slots 50 and 52 are elongated to allow the hitch 42 to slide in relationship to the trailer housing 22 (FIG. 3). To reduce friction and torsion of the hitch 42 relative to the trailer housing 22, the bolts 54 and 56 are provided with rollers 58 and 60 which ride on the push plate 48 and body 46 of the trailer hitch 42, respectively. As the towing vehicle 86 shows, the momentum of the trailer will tend to cause it to surge forward relative to the towing vehicle. As the trailer surges forward, housing 22 slides forward relative to the hitch 42, causing push plate 48 to activate the trailer brake 14.

Screwed onto a threaded end of the piston push rod 36 is an end cap 62 (FIG. 2). The end cap 62 prevents a sleeve 64 provided around the piston push rod 36 from sliding off of the piston push rod 36. Secured to the sleeve 64 is a brake actuation plate 66. Provided between the brake actuation plate 66 and a back plate 68 welded to the piston push rod 36 is a prestressed spring 70 which prevents the braking system 14 from becoming inadvertently actuated.

The push plate 48 is provided with an aperture which allows the sleeve 64 to pass through the push plate 48 (FIG. 2). The brake actuation plate 66, sleeve 64, and end cap 62 maintain the stress on the prestressed spring 70 and prevent the prestressed spring 70 from becoming removed from the piston push rod 36.

After passing along the channel 16 provided in the lever 18, the cable 12 passes through the trailer housing 22 and is secured to the brake actuation plate 66 (FIG. 2). Preferably, the channel 16 in the lever 18 is of a depth and width sufficient to guide the cable 12 along the lever 18 while preventing the catch pin 26 from subjecting the cable 12 to undue wear during break-away actuation of the braking system 14.

Figure 9A:
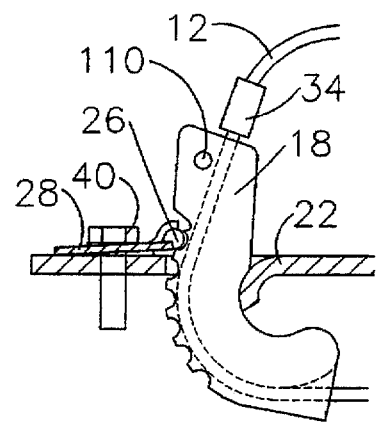
FIGS. 9a, 9b and 9c are side details showing the action of the lever and catch pin during a break-away actuation.
Figure 9B:
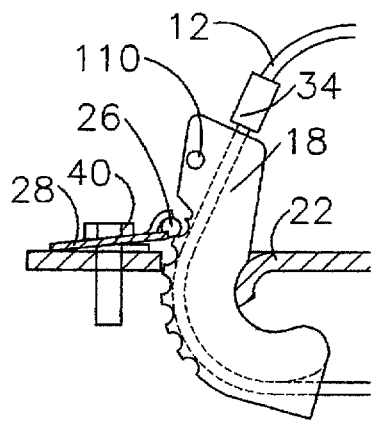

The break-away lever lock assembly 20, consists of the lever 18, the catch spring 28, the catch pin 26, the roll pin 110, and the stop 34. The action of the break-away lever lock assembly during the beginning of a break-away actuation is shown generally in FIGS. 9a–c. A first end of the catch spring is attached to the housing 22 by two of the master cylinder bolts 40. When the assembly is in the nonactuation position (FIG. 9a) the catch pin 110 is captured between the teeth 24 of the lever 18, the housing 22, and the catch spring 28. As the lever 18 is pivoted towards the actuation position by the pull of the towing vehicle 86 on the cable 12, the catch pin 26 is moved up away from the housing 22. The catch spring 28, creates a force down and toward the housing 22, but allows the teeth 24 to pass by the catch pin 26 (FIG. 9b). After the assembly has been move part way to the actuation position (FIG. 9c), the lever 18 is prevented from pivoting away from the actuation position by the catch pin 26 being caught by housing 22.

Figure 10A:
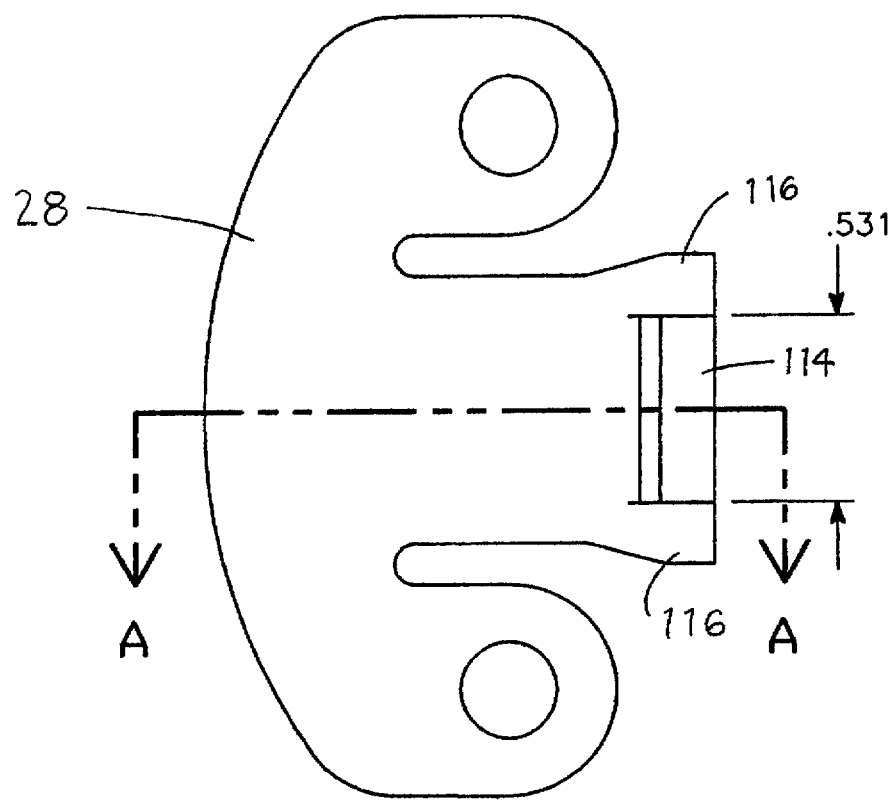
FIGS. 10a & b are a plan view and cross-section of the catch spring of the preferred embodiment.
Figure 10B:
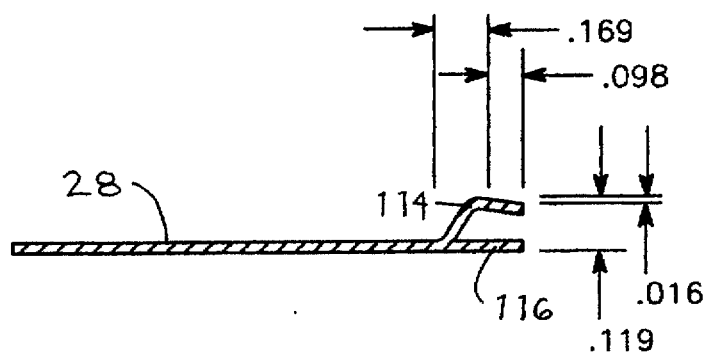

A preferred embodiment of the catch spring 28 is shown in detail in FIGS. 10a and 10b. In the preferred embodiment the catch spring is made of 0.035 inch thick stainless steel. The catch spring 28 has is made to capture the catch pin 26 between a hood 114 and two tabs 116. The dimensions of the hood and tabs for the preferred embodiment are shown in FIGS. 10a and 10b. A cylindrical catch pin 26 that has a diameter of 0.25 inches and a length of 0.53 inches is appropriate for this catch spring.

As shown in FIG. 1, one end of the cable 12 is formed into a loop 74 and secured to itself by means of a crimp connector 76. An S-hook 30 is connected through the loop 74 of the cable 12. The end of the S-hook 30 which passes through the loop 74 is bent until the curved end touches the main body of the S-hook 30 to prevent the S-hook 30 from accidentally slipping off of the cable 12. The opposite end of the S-hook 30 is left in an open curve so that the hook 30 may be releasably attached to the towing vehicle 86.

In operation, the hitch 42 is mounted onto a pulling ball 80 of a towing vehicle 86 (FIG. 3). Thereafter, a hitch locking assembly 82 is pressed downward to prevent release of the hitch 42 from the pulling ball 80. Any pulling ball engagement mechanism may be used. The lever 18 is checked to ensure that it is in the nonactuation position before the S-hook 30 is attached to the towing vehicle 86. If the lever 18 is in the actuated position as shown in FIG. 4, the catch pin 26 is released and the lever 18 is pivoted back into the nonactuation position shown in FIG. 3. The S-hook 30 should be attached to a portion of the towing vehicle 86 which is sturdy enough to straighten the S-hook 30 without damaging the towing vehicle 86. The break-away mechanism 10 is thereafter ready for operation.

The hitch locking assembly 82 is used to lock the hitch 42 to the pulling ball 80. Any hitch locking assembly is acceptable. The assembly shown in the figures has a ball lock handle 102, a torsion spring 104, a pin 10, and a flange (not shown) that extends into the hitch 46 to capture the pulling ball 80. The lock handle 102 is pressed down and toward the housing 22 after the hitch 46 is lower over the pulling ball 80. To release the hitch locking assembly 82, the lock handle 102 is pulled up and away from the housing 22.

Figure 8:
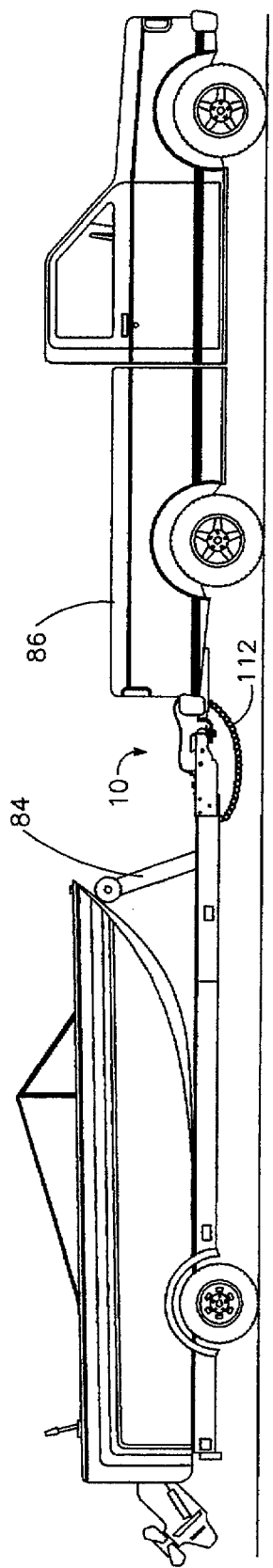
FIG. 8 is a side elevation showing the braking mechanism of FIG. 1 in a nonactuation towing position.
Figure 9C:
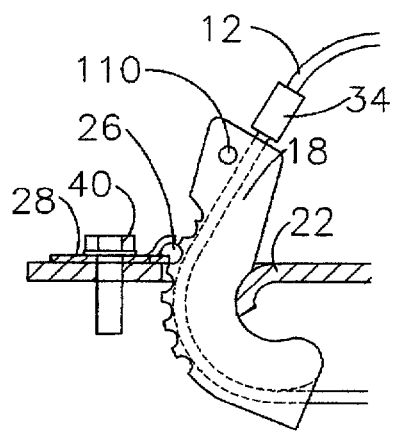

Under ideal conditions, the break-away mechanism 10 of the present invention should never actuate the trailer braking system 14 (FIG. 3). Even if the hitch 42 should disengage from the pulling ball 80 due to rough road conditions, disengagement of the hitch 42 and ball 80, or for whatever reason, the trailer safety chains 112 should maintain the trailer 84 close to the towing vehicle 86 and prevent the trailer 84 from rolling down the road unattended (FIG. 8). If, however, the safety chains 112 should fail, the break-away mechanism 10 of the present invention will act to stop the trailer 84 before the trailer 84 continues down the roadway to cause further damage to itself or bystanders. Once the hitch 42 becomes disengaged from the ball 80 and the safety chains 112 fail, friction will generally tend to slow the trailer 84 in relationship to the towing vehicle 86. As the trailer 84 slows, the cable 12 remains connected to the towing vehicle 86 and is, therefore, pulled toward the towing vehicle 86. As the cable 12 is pulled, the lever 18 is pivoted in relationship to the housing and the brake actuation plate 66 is moved toward the braking system 14 which causes the spring 70 to move the stop plate 68 and, therefore, the piston push rod 36 into the master cylinder 32. The master cylinder 32 is actuated more and more as the piston push rod 36 is moved further and further by the cable 12. As the master cylinder 32 is actuated, the trailer 84 slows down, thereby causing the lever 18 to pivot relative to the trailer housing 22 as far as possible. As the lever 18 pivots, the catch spring 28 bends away from the trailer housing 22 to allow the catch pin 26 to ride over the teeth 24 of the lever 18 (FIGS. 9a–c). Once the lever 18 has reached its fully actuated position (FIG. 4), the catch spring 18 biases the catch pin 26 into engagement with the teeth 24 to prevent the lever 18 from pivoting back into its nonactuation position and to prevent the cable 12 from releasing the braking system 14.

When the brake actuation plate 66 has been pulled toward the master cylinder 32 as far as possible, the S-hook 30 begins to straighten. After the S-hook 30 has sufficiently straightened, the S-hook 30 releases the cable 12 from the towing vehicle 86. The cable 12, however, is prevented from sliding past the lever 18 through the channel 16 by the stop 34, just as the lever 18 itself is prevented from rotating into its nonactuation position by the catch pin 26 (FIG. 4).

As the lever 18 is locked into its actuation position and the cable 12 is prevented from returning to its preactuation position, the master cylinder 32 remains applied to bring the trailer 84 to a complete stop. The person operating the pulling vehicle will likely notice the trailer 84 has become disengaged from the towing vehicle 86 and will then return to reattach the trailer 84 to the towing vehicle 86 after checking that neither the trailer 84 nor the towing vehicle 86 were damaged from the disengagement. Because the trailer braking system 14 had been engaged, the lever 18 will be pivoted relative to the trailer housing 22 as shown in FIG. 4.

After the cause of the disengagement is determined and corrected, the braking system 14 must be returned to operational and nonactuated status before the trailer 84 can again be pulled. First, the catch spring 28 is removed by removing bolts 40. The lever 18 is rotated slightly forward to release the catch pin 26. The lever 18 is then pivoted into its nonactuation position. As the lever 18 is pivoted, the portion of the cable 12 between the lever 18 and the brake actuation plate 66 becomes slack, allowing hydraulic fluid back pressure within the master cylinder 32 to push the piston push rod 38 and brake actuation plate 66 to their nonactuation positions shown in FIG. 3. The catch spring 28 is reattached with the catch pin 26 being retained between the catch spring 28 and the lever 18. The failed S-hook 30 is replaced and the hitch 42 is placed back on the pulling ball 80. The cable 12 is then reattached to the towing vehicle 86 and the break away mechanism 10 is again ready for operation.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. By way of example, it should be clear that the actual dimensions of the lever 18 and the number of teeth may be modified to actuate various types of available trailer brakes.

What is claimed is:

1. A trailer braking mechanism which actuates a trailer brake when a trailer becomes detached from a pulling vehicle, comprising:
   (a) a trailer housing;
   (b) a lever pivotally engaged by said housing;
   (c) a catch spring having a first end secured to said housing and a second end retaining a catch pin, said catch spring having a hood and two tabs at said second end of said catch spring to capture said catch pin by holding said catch pin in engagement with said lever such that said catch pin allows said lever to pivot in a first direction relative to said housing and prevents said lever from pivoting in a second direction relative to said housing; (d) means for connecting said lever to the trailer brake such that the trailer brake is actuated as said lever pivots in said first direction; and (e) means for releasably connecting said lever to the pulling vehicle such that as the trailer moves away from the pulling vehicle, said lever pivots in said first direction.

2. The braking mechanism of claim 1, wherein said releasable connection means releases from the pulling vehicle when the trailer moves away from the pulling vehicle.

3. The braking mechanism of claim 2, wherein said releasable connection means is a cable having a hook which releasably attaches to the pulling vehicle, said hook disconnecting from the pulling vehicle by deforming upon sufficient tension in said cable.

4. The braking mechanism of claim 1, wherein said housing at least partially encloses said trailer brake.

5. The braking mechanism of claim 1, further comprising a surge actuation assembly which actuates said trailer brake when the speed of the trailer becomes greater than the speed of the pulling vehicle.

6. The braking mechanism of claim 1, wherein said trailer brake connecting means is a cable.

7. The braking mechanism of claim 1, wherein said pulling vehicle connecting means is a cable.

8. The braking mechanism of claim 1, wherein said lever is provided with a curved side having a plurality of teeth capable of being engaged by said catch pin, said curved side being provided with a channel for guiding said pulling vehicle connecting means around said curved side of said lever.

9. A trailer braking mechanism which actuates a trailer brake when a trailer becomes detached from a pulling vehicle, comprising:
   (a) a trailer housing being provided with an aperture;
   (b) a lever provided through said aperture and pivotally engaged by said housing, said lever being provided with a curved side having a plurality of teeth, said curved side being provided with a channel;
   (c) a cable connecting the pulling vehicle to the trailer brake;
   (d) means for preventing said cable from moving in at least one direction relative to said channel;
   (e) a catch spring having a first end secured to said housing and a second end retaining a catch pin, said catch spring holding said catch pin in engagement with said teeth such that said catch pin allows said lever to pivot in a first direction relative to said housing toward an actuation position and prevents said lever from pivoting in a second direction relative to said housing towards a nonactuation position; and
   (f) a channel in said curved side of said lever to guide said cable along said curved side of said lever, said channel being of a sufficient depth to prevent said catch pin from contacting said cable.

10. The braking mechanism of claim 9, wherein said catch spring comprises a hood and two tabs at said second end of said catch spring to capture said catch pin.

11. The braking mechanism of claim 9, wherein said pulling vehicle connecting means is secured to the pulling vehicle by means of an S-hook of a construction which straightens under pressure to disconnect said pulling vehicle connecting means from the pulling vehicle.

12. The braking mechanism of claim 9, wherein said housing at least partially encloses said trailer brake.

13. The braking mechanism of claim 9, further comprising a surge actuation assembly which actuates said trailer brake when the speed of the trailer becomes greater than the speed of the pulling vehicle.

14. The braking mechanism of claim 9, wherein said cable is connected to the pulling vehicle by an S-hook, and wherein said S-hook is of a construction which straightens under pressure to disconnect said cable from the pulling vehicle.

15. A trailer brake mechanism which actuates a trailer brake when a trailer becomes detached from a pulling vehicle, comprising:
   (a) an arcuate ratchet having a first end, a second end, a concavely curved surface, and a convexly curved surface, wherein said concavely curved surface is substantially smooth, and wherein said convexly curved surface is provided with a channel bordered on either side with two parallel sets of flanges;

(b) a trailer housing provided with an aperture, wherein said aperture is bordered by at least one curved surface which coacts with said concavely curved surface of said arcuate ratchet to allow said arcuate ratchet to rotate in relationship to said housing;

(c) a cable connecting the pulling vehicle to the trailer brake wherein the trailer brake is provided within the trailer housing, and wherein said cable is provided in said channel of said arcuate ratchet in a manner which rotates said arcuate ratchet in relationship to said housing as force is applied to said cable;

(d) means provided on said cable for preventing said cable from moving in relationship to said channel of said arcuate ratchet; and (e) a catch spring having a first end secured to said housing and a second end retaining a catch pin, wherein said catch pin is oriented into a position which allows said catch pin to engage flanges of said two parallel sets of flanges to prevent said arcuate ratchet from moving in relationship to said housing.

16. The trailer braking mechanism of claim 15, wherein said housing encloses said trailer brake.

17. The braking mechanism of claim 15, further comprising a surge actuation assembly which actuates said trailer brake when the speed of the trailer becomes greater than the speed of the pulling vehicle.

18. The braking mechanism of claim 17, wherein said S-hook is designed to straighten under pressure to disconnect said cable from the pulling vehicle.

19. The braking mechanism of claim 15, further comprising an S-hook releasably connected between said cable and the pulling vehicle.

* * * * *